Aug. 9, 1966
H. KASTAN
3,265,417
SPLICING DEVICE FOR STRUCTURAL PANEL SECTIONS
Filed Aug. 19, 1963
3 Sheets-Sheet 2
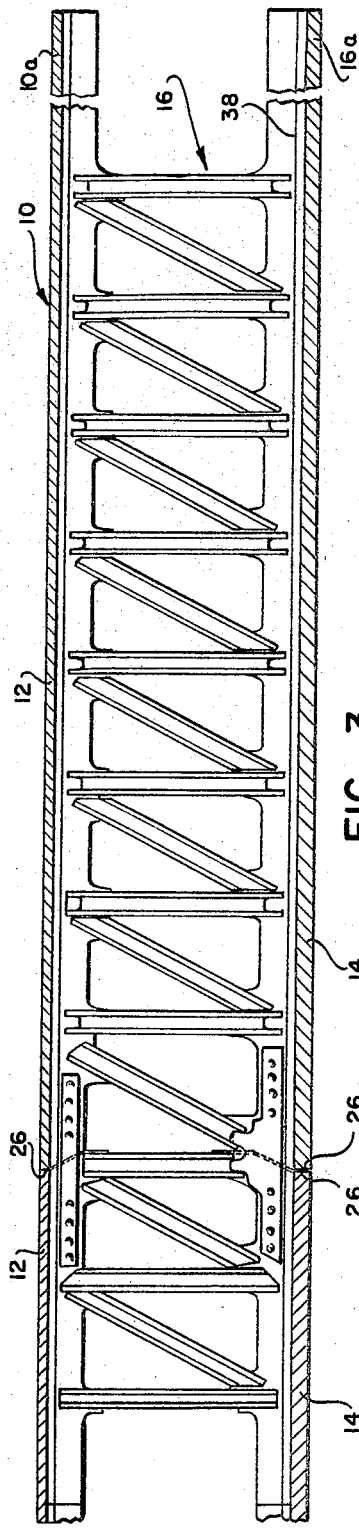
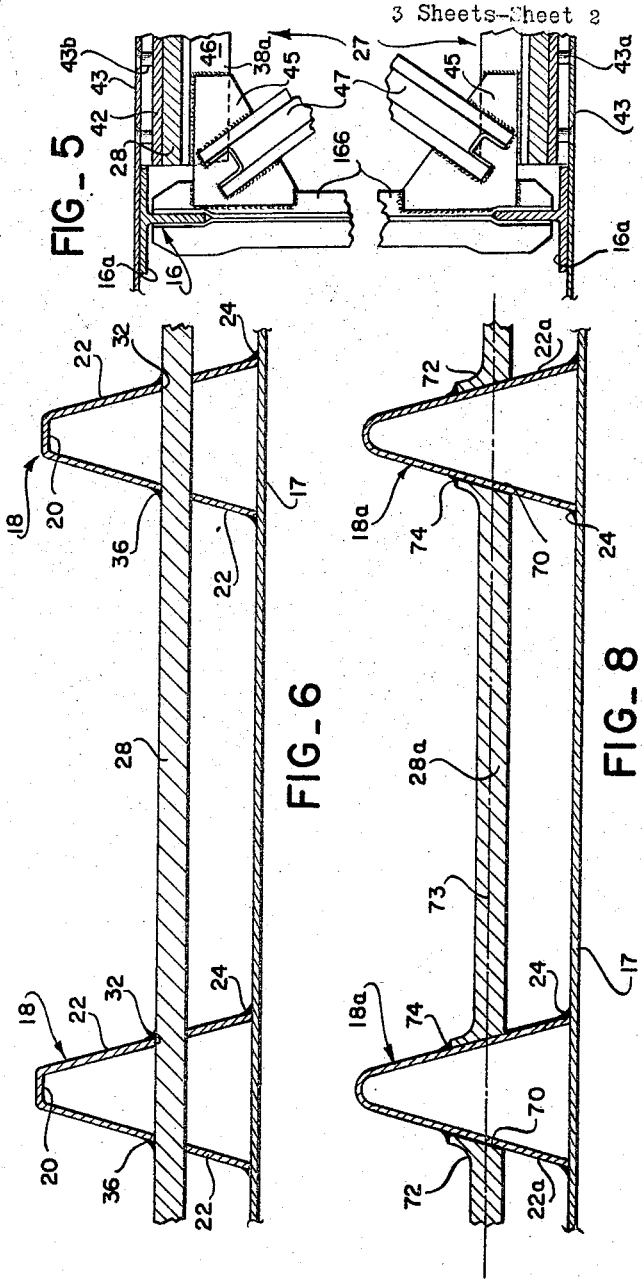
INVENTOR.
HOWARD KASTAN
BY
George C. Sullivan
Agent Aug. 9, 1966  H. KASTAN  3,265,417
SPLICING DEVICE FOR STRUCTURAL PANEL SECTIONS
Filed Aug. 19, 1963  3 Sheets-Sheet 3
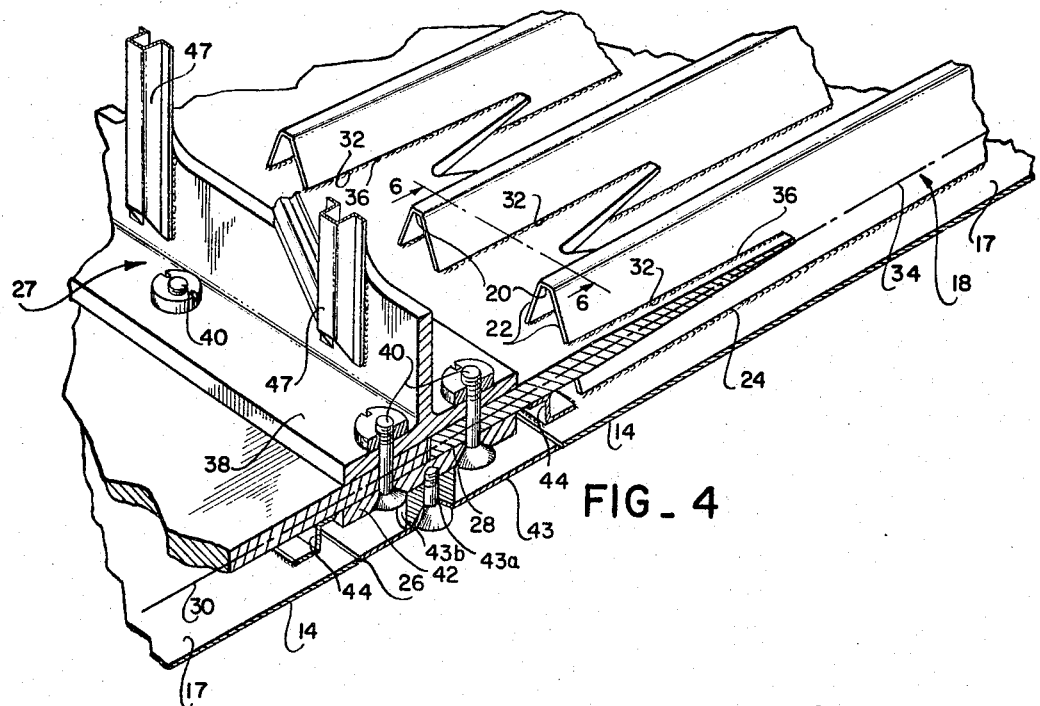
FIG_4
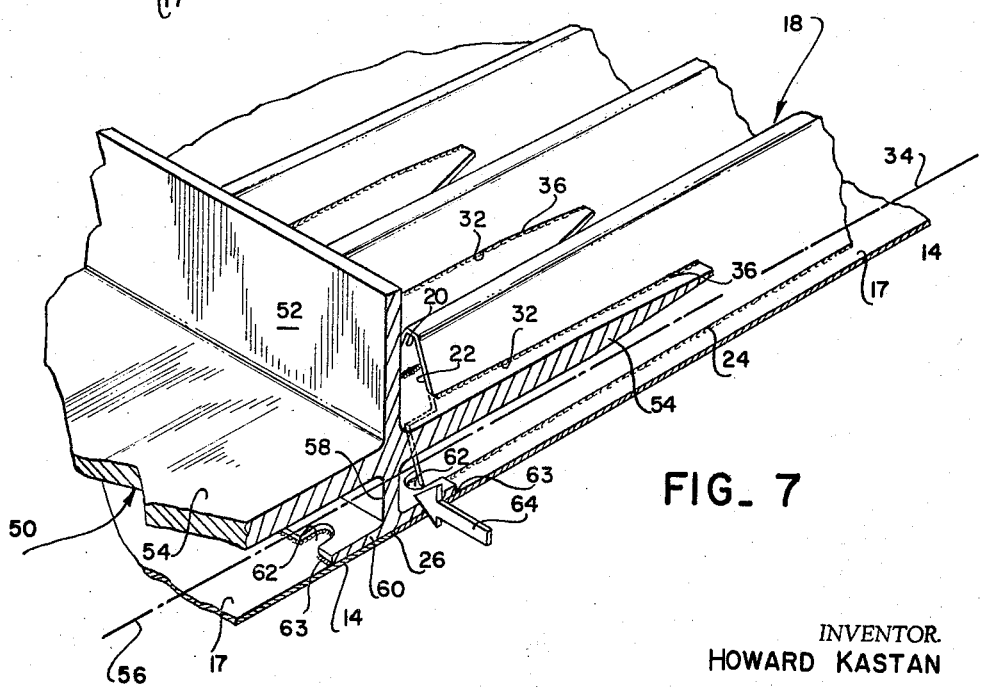
FIG_7
*INVENTOR.*
HOWARD KASTAN
BY
George C. Sullivan
Agent

United States Patent Office 3,265,417
Patented August 9, 1966

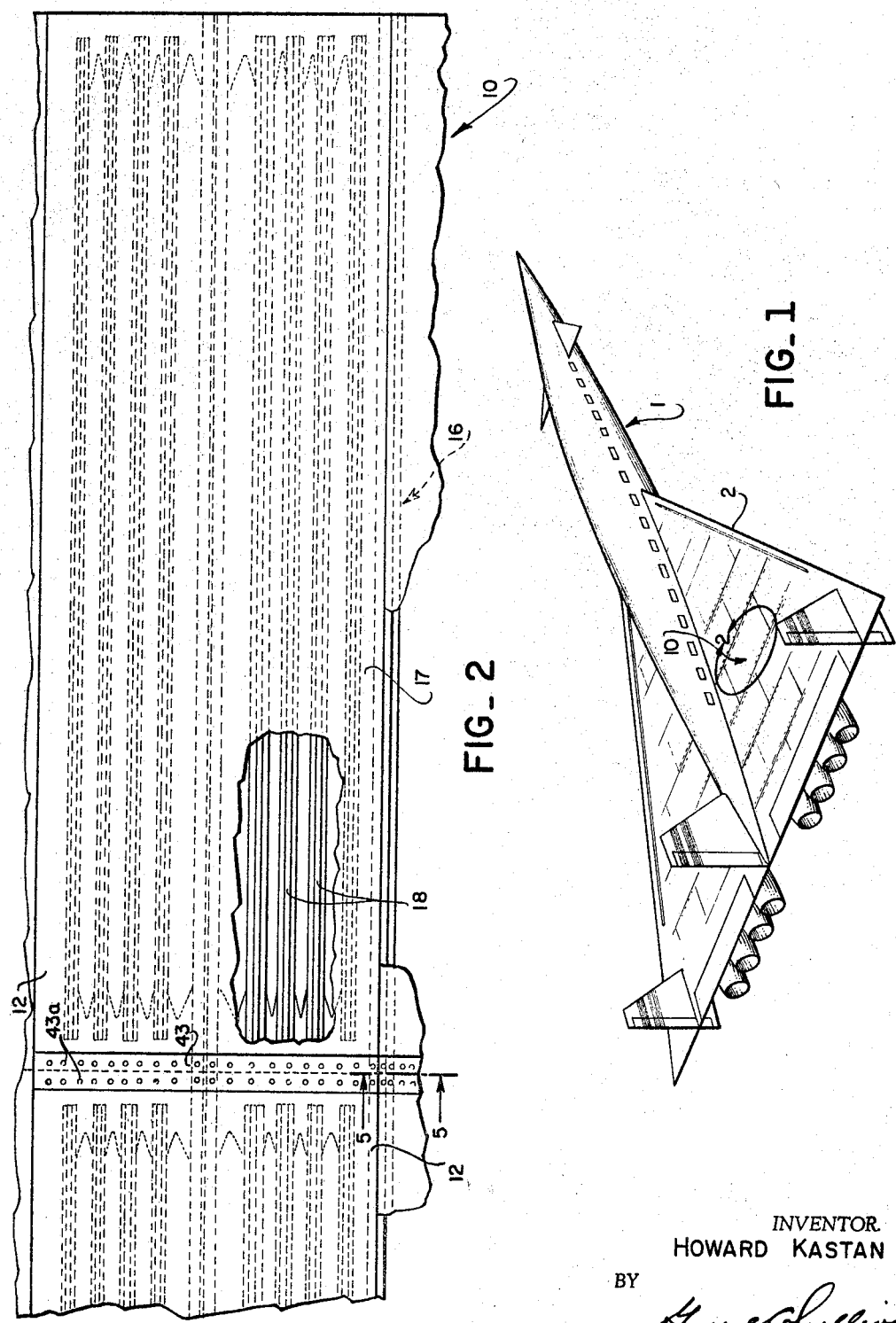

3,265,417
SPLICING DEVICE FOR STRUCTURAL PANEL SECTIONS
Howard Kastan, Northridge, Calif., assignor to Lockheed Aircraft Corporation, Burbank, Calif.
Filed Aug. 19, 1963, Ser. No. 303,042
9 Claims. (Cl. 287—189.36)

This invention relates to a splicing device for structural panels, and more particularly to such a device for splicing shear and axially loaded built-up panel sections together and for attaching such sections to bulkhead intersections.

Structural or built-up panels are subjected to shear and axial loads in many applications. The wings of aircraft, for example, include such panels which are attached together to form the surface of a wing. Prior art splicing devices for joining panel sections together include long, heavily flanged members and non-symmetrical reinforcing doublers. Also, mechanical fasteners are sometimes used to connect the individual structural elements together. In other cases, the elements are connected together by spot welding. While generally satisfactory, prior art splicing devices do have certain disadvantages.

One disadvantage resides in the fact that the splicing devices usually provide eccentric loadings and stress concentrations. When applied to supersonic aircraft, such loadings and stress concentrations are very objectionable.

Another disadvantage with prior art splicing devices resides in the fact that they are not readily adaptable to complicated stiffener shapes and the connections are difficult to seal without sealing materials. Sealing difficulties become quite important when integral fuel tanks are to be incorporated into designs, such as for supersonic aircraft, where they are exposed to extremely high temperatures which destroy sealing materials.

In view of the foregoing factors and conditions characteristic of splicing devices for connecting built-up panel sections together, it is a primary object of the present invention to provide a new and improved splicing device not subject to the disadvantages enumerated above and having short, light, direct connection means which is concentric and is free of stress concentrations.

Another object of the present invention is to provide a splicing device of the type described which is readily adaptable to sealing panel sections for use as an integral fuel tank without the need of gaskets or sealing compounds.

Yet another object of the present invention is to provide a splicing device of the type described for connecting built-up panel stiffeners to bulkhead intersections.

A further object of the present invention is to provide a new and improved bulkhead cap for bulkheads in aircraft wing structures.

A still further object of the present invention is to provide a new and improved joint plate for splicing shear loaded and axially loaded built-up panel sections together.

According to a first embodiment of the present invention, built-up panel sections of an aircraft wing are spliced together by means of flat, joint plates which run the entire length of the edges of the sections to be joined. The plates are parallel to the panel surfaces and include tapered edges which fit into wedge-shaped grooves cut into the ends of the panel stiffeners. The grooves are cut along the centroidal axes of the panels. The plate for one panel butts up to the plate on the other panel and the two are joined by mechanical fasteners between a butt strap and a cover plate. This provides a double-shear, concentric joint inside the butt surface of the panel. The gap between the joined panels at the surface is covered by a thin plate. A shear transfer member is placed between the double-shear concentric joint and the stiffeners which attaches the joint plate to the skin. Fusion welding, brazing or gluing may be used to attach the joint plate to the stiffeners and to the shear transfer member and also to attach the shear transfer member and stiffeners to the skin. This forms a liquid-tight structure without using sealing materials.

In a second embodiment of the present invention, connecting means is provided for connecting built-up panel sections to bulkheads in aircraft wings. The stiffeners of the built-up panels are slotted in the same manner as described above, but the concentric load transfer joint and joint plate are both incorporated into the cross-sectional design of the bulkhead cap. All attachment is again accomplished by fusion welding, brazing or gluing, thereby providing a fluid-tight structure.

In a third embodiment, the grooves are eliminated from the stiffeners and the joint plate is notched to engage the stiffeners.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of a supersonic aircraft which may incorporate a splicing device of the present invention;

FIGURE 2 is a plan view of the portion of a wing of the aircraft of FIGURE 1 enclosed within circle 2;

FIGURE 3 is an elevational view of the wing section of FIGURE 2;

FIGURE 4 is a perspective view of a splicing device constituting a first embodiment of the present invention;

FIGURE 5 is a partial cross-sectional view taken along line 5—5 of FIGURE 2;

FIGURE 6 is a cross-sectional view taken along line 6—6 of FIGURE 4;

FIGURE 7 is a perspective view of a splicing device constituting a second embodiment of the present invention; and FIGURE 8 is a cross-sectional view of a splicing device constituting a third embodiment of the present invention.

Referring again to the drawings, an aircraft 1 includes a wing 2 having a portion 10 which is shown as including a plurality of built-up or structural panels 12 forming the upper surface of wing 2 and a similar plurality of panels 14 forming its lower surface. The panels 12 and 14 are attached to spars or shear beams, such as the one shown at 16, which includes upper and lower cap members 16a and truss members 16b. The spars 16 may be attached to the aircraft 1 by any suitable means (not shown).

The panels 12 and 14 each include an outer skin 17 of thin-gauge material which is given load-carrying ability by a plurality of stiffeners 18. The stiffeners 18 are substantially U-shaped and each has a bight portion 20 and a pair of legs 22. The stiffeners 18 are secured to the skin 17 with continuous weldments 24 which extend along the edges of the legs 22. The weldments 24 form liquid-tight connections with the skin 17 and may be applied by fusion welding, grazing or gluing.

The ends 26 of the panels 14 may be spliced together at a rib 27 of wing 2. This is accomplished by connecting a joint plate 28 to each panel 14. Each plate 28 is wedge-shaped and has a centroidal axis 30. Each plate 28 engages wedge-shaped grooves or slots, such as the slots 32 (FIGURE 4), cut into each stiffener 18 along the centroidal axis 34 of the associated panel 14. The grooves 32 are cut into the stiffeners 18 adjacent the ends 26 of panels 14. The joint plates 28 are secured in the grooves 32 by continuous weldments 36. The panels 14 are joined together by connecting the joint plates 28 to the rib 27. This is accomplished by passing bolts 40 through the plates 28 and a first butt strap 38 forming one cap of rib 27. The bolts 40 also pass through a second butt strap 42 placed over the joint plates 28 to form a double-shear, concentric joint with the rib 27. The gap between the ends 26 may be closed with a cover 43 which is secured to butt strap 42, as by screws 43a extending through spacers 43b.

A Z-shaped, shear transfer member 44 is welded between the ends 26 of each panel 14 and its associated joint plate 28 to transfer loads from the panels 14 to the plates 28.

It is to be understood that the panels 12 may be connected in like manner to the other cap 38a (FIGURE 5) of rib 27.

The rib 27 is connected to the spar 16 by upper and lower gusset plates 45 (FIGURE 5) which are rigidly affixed to a truss member 16b of spar 16 and to the upper and lower webs 46 of rib 27, respectively. The truss member 47 of rib 27 is then rigidly affixed to an associated gusset plate 45.

The splicing device of the first embodiment of the present invention forms a short, direct, light, concentric splicing arrangement for shear and axially loaded built-up panel structures. This splicing device makes it possible to employ aircraft wing sections as fuel tanks without the need of sealing compounds because the various weldments employed form fluid-tight connections.

The splicing device constituting a second embodiment of the present invention may be employed to seal bulkhead intersections in air craft wings and the like. This splicing device includes a beam member or bulkhead cap 50 (FIGURE 7). The cap 50 includes web portions 52 and 58. Two pairs of load transfer plates 54 and 60 extend from the web portions 52 and 58 and have a combined centroidal axis 56. The plate 60 is provided with notches 62.

Panels 14, which are identical with those described above in connection with the first embodiment of the invention, have their ends 26 secured to the plates 60 by continuous weldments 63 forming fuel cross-feed channels 64. The load transfer plate 54 is securely welded in the grooves 32 by continuous weldments 36 with the stiffeners 18 engaging the notches 62.

In a third embodiment of the present invention, the grooves 32 are eliminated from stiffeners 18. As shown in FIGURE 8, the stiffeners 18a have legs 22a which are not interrupted with grooves. The legs 22a are rigidly affixed to skin 17 with weldments 24, as in the previous embodiments. The joint plates 28a are modified from those shown in the first embodiment by providing them with notches 70 and fillets 72 which engage stiffeners 18a along their centroidal axes 73 and which are secured to stiffeners 18a by continuous weldments 74.

While the particular splicing devices herein shown and described in detail are fully capable of attaining the objects and providing the advantages hereinbefore stated, it is to be understood that they are merely illustrative of the presently preferred embodiments of the present invention and that no limitations are intended to the details of construction or design herein shown other than as defined in the appended claims.

What is claimed is:

1. In combination with a structural panel having stiffeners rigidly affixed to a skin portion, said stiffeners extending along said skin portion to a point adjacent one end thereof, a splicing device for connecting said panel to adjacent structure, said splicing device comprising:
    (a) a flat load transfer plate overlying said one end of said skin portion in engagement with said stiffeners along the centroidal axis of said panel and the plate being spaced from the skin portion;
    (b) means rigidly affixing one end of said plate said stiffeners and the other end of said plate to said adjacent structure; and
    (c) means for securing the load transfer plate to the skin portion.

2. The combination of claim 1 in which the securing means is a shear transfer member rigidly connecting said one end of said skin portion to said load transfer plate.

3. The combination of claim 1 wherein said flat load transfer plate is wedge-shaped and engages similarly shaped grooves extending along said centroidal axis.

4. The combination of claim 1 wherein said flat load transfer plate includes notches being disposed between said stiffeners.

5. A splicing device for connecting adjacent ends of structural panels to a rib member having a cap portion, said cap portion including a first butt strap, said panels including skin portions and stiffeners affixed to said skin portions, said stiffeners extending along said skin portions to points adjacent one of their ends, said splicing device comprising:
    (a) a load transfer plate overlying each of said one ends of said skin portions and having one end affixed to said stiffeners along the centroidal axis of an associated panel, the other ends of said load transfer plates abutting each other on said first butt strap;
    (b) a second butt strap overlying said other ends of said load transfer plates and said first butt strap; and
    (c) means rigidly affixing said second butt strap and said other ends of said load transfer plates to said first butt strap to form a double-shear, concentric joint with said rib.

6. The splicing device of claim 5 including a shear transfer member rigidly connecting said one end of each of said skin portions to its overlying load transfer plate.

7. A splicing device for connecting adjacent ends of structural panels together, said panels including skin portions and stiffeners affixed to said skin portions, said stiffeners extending along said skin portions to points adjacent one of their ends, said splicing device comprising:
    (a) a beam member including a first web portion;
    (b) a first pair of load transfer plates extending from said web portion, said first load transfer plates being connectable to said stiffeners;
    (c) a second web portion connected to said first load transfer plates in alignment with said first web portion; and
    (d) a second pair of load transfer plates extending from said second web portion, said second load transfer plates including notches engageable by said stiffeners when said second load transfer plates are affixed to said one ends of said skin portions, said first and second pairs of transfer plates having a common centroidal axis lying along the centroidal axes of said panels.

8. The splicing device of claim 7 wherein said first pair of load transfer plates are wedge-shaped and engage wedge-shaped slots in said stiffeners.

9. A bulkhead cap for sealing bulkhead intersections in aircraft wings and the like, having structural panels comprising:
    (a) a beam member including a first web portion;
    (b) a first pair of load transfer plates extending from said web portion for connection to said structural panels;
    (c) a second web portion connected to said first pair of load transfer plates in alignment with said first web portion; and
    (d) a second pair of load transfer plates extending from said second web portion for connection to said panels to transfer loads from said panels to said first and second pairs of load transfer plates.

References Cited by the Examiner

UNITED STATES PATENTS

| 2,098,752 | 11/1937 | Miller | 244—123 X |
| 2,392,788 | 1/1946 | Watter | 52—483 X |
| 2,393,081 | 1/1946 | Watter | 244—124 |
| 2,615,234 | 10/1952 | Dumbleton | 244—124 X |

REINALDO P. MACHADO, *Primary Examiner.*

HARRISON R. MOSELEY, *Examiner.*

L. J. SANTISI, *Assistant Examiner.*